(12) United States Patent
Sacks et al.

(10) Patent No.: US 8,786,952 B2
(45) Date of Patent: *Jul. 22, 2014

(54) METHOD AND ASSEMBLY FOR THREE-DIMENSIONAL PRODUCTS

(75) Inventors: Andrew B. Sacks, Huntingdon Valley, PA (US); John Lee, Jenkintown, PA (US); Hyunin Chung, Seoul (KR)

(73) Assignee: aviDDD, LLC, New York, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/205,101

(22) Filed: Aug. 8, 2011

(65) Prior Publication Data

US 2011/0292503 A1  Dec. 1, 2011

Related U.S. Application Data

(63) Continuation of application No. 12/502,461, filed on Jul. 14, 2009, now Pat. No. 8,018,655.

(60) Provisional application No. 61/080,800, filed on Jul. 15, 2008.

(51) Int. Cl.
  *G02B 27/10* (2006.01)
  *G03B 21/60* (2014.01)

(52) U.S. Cl.
  USPC .......................... 359/619; 359/621; 359/455

(58) Field of Classification Search
  USPC .................................................. 359/619–626
  See application file for complete search history.

(56) References Cited

U.S. PATENT DOCUMENTS

| | | | |
|---|---|---|---|
| 4,405,676 A | 9/1983 | Pohl | |
| 5,624,732 A | 4/1997 | Oshima et al. | |
| 5,723,200 A | 3/1998 | Oshima et al. | |
| 5,753,344 A | 5/1998 | Jacobsen | |
| 6,090,471 A | 7/2000 | Abrams | |
| 6,544,369 B1 | 4/2003 | Kitamura et al. | |
| 6,751,024 B1 | 6/2004 | Rosenthal | |
| 6,791,541 B1 * | 9/2004 | Czuchry et al. | 345/419 |
| 7,130,126 B1 | 10/2006 | Chung | |
| 7,153,555 B2 | 12/2006 | Raymond et al. | |
| 7,281,810 B2 | 10/2007 | Lee | |
| 7,312,926 B2 * | 12/2007 | Hunt | 359/619 |
| 8,018,655 B2 * | 9/2011 | Sacks et al. | 359/619 |

(Continued)

FOREIGN PATENT DOCUMENTS

| | | |
|---|---|---|
| JP | 06-305105 | 11/1994 |
| JP | 2006001153 | 1/2006 |

(Continued)

*Primary Examiner* — Mohammed Hasan

(57) ABSTRACT

Provided are methods for making a product having a three-dimensional surface. The method includes providing a base material, providing an adhesive layer and positioning the adhesive layer relative to the base material. The method includes providing a three-dimensional sheet having a top surface and a bottom surface, the top surface having a convex lens layer. The three-dimensional sheet is positioned relative to the base material based on a registration of an image on the three-dimensional sheet and is secured to the base material using the adhesive layer. Securing the three-dimensional sheet to the base material can include applying pressure to the three-dimensional sheet in successive steps of increasing pressure. Also provided is a product having a three-dimensional surface that includes a base material, a three-dimensional sheet, and an adhesive layer disposed between the base material and three-dimensional sheet and configured to secure the three-dimensional sheet to the base material.

9 Claims, 10 Drawing Sheets

(56) References Cited

U.S. PATENT DOCUMENTS

| | | |
|---|---|---|
| 2002/0034007 A1 | 3/2002 | Karszes |
| 2003/0044595 A1 | 3/2003 | Christian et al. |
| 2004/0263971 A1 | 12/2004 | Lipton et al. |
| 2008/0160226 A1 | 7/2008 | Kaule et al. |

FOREIGN PATENT DOCUMENTS

| | | |
|---|---|---|
| KR | 200311905 | 5/2003 |
| KR | 1020050048726 | 5/2005 |
| KR | 1020070001533 | 1/2007 |
| KR | 1020070080608 | 8/2007 |
| KR | 20080006553 | 12/2008 |
| KR | 1020080105704 | 12/2008 |
| WO | 9315914 A1 | 8/1993 |
| WO | 2007105837 A1 | 9/2007 |
| WO | 2008042349 A2 | 4/2008 |
| WO | 2009001983 A1 | 12/2008 |

\* cited by examiner

METHOD AND ASSEMBLY FOR THREE-DIMENSIONAL PRODUCTS

CROSS REFERENCE TO RELATED APPLICATIONS

This application is a continuation of U.S. Utility patent application Ser. No. 12/502,461, filed Jul. 14, 2009, now issued as U.S. Pat. No. 8,018,655, which claims priority to U.S. Provisional Patent Application Ser. No. 61/080,800, filed Jul. 15, 2008, which applications are incorporated herein by reference in their entireties.

FIELD OF THE INVENTION

The present invention relates to a method and assembly for three-dimensional products, and more particularly, to a three-dimensional sheet, having an array of identical semispherical convex lenses formed on a top surface thereof, applied to a base material to form a product with a three-dimensional surface.

BACKGROUND

Generally, a three-dimensional plastic sheet is formed of a lenticular screen that has an array of semi-cylindrical lenses each having a pitch of about 0.5 mm formed on the top surface of the sheet. In case of a three-dimensional photographic printing, the images of an object seen by left and right eyes are each printed on a sheet of lenticular screen, thereby obtaining a three-dimensional image where the object looks like floating in the space or going away into the space when seen through the two eyes.

In this case, the lenticular screen that has the plurality of semi-cylindrical lenses serially arranged on the top surface of the plastic sheet gives the three-dimensional effect just to the left and right sides with respect to the length direction of each lens, but does not give any three-dimensional effect to the upper and lower sides thereof, such that there is a defect in that the viewing angle for the three-dimensional image is limited.

On the other hand, a conventional three-dimensional plastic sheet is formed in such a fashion that a printed surface seen through a lens layer having an array of lenses formed thereon is recognized thus to observe a designed three-dimensional image, wherein the printed surface is processed by means of general offset printing, for production in great quantities. At this time, there occurs a problem that since the conventional plastic sheet does not have any high resolution due to the embossing effect of the lenses seen through the lens layer, the printed screen cannot be vivid and clear.

On a general offset printing screen, moreover, numerous dots constituting the printed screen are refracted on the lens layer to cause the generation of moiré patterns or dizzy illusion due to the interference of the dots, such that more vivid three-dimensional screen cannot be provided.

With the conventional three-dimensional plastic sheet processed by means of the offset printing, therefore, a simple pattern of three-dimensional image should be displayed through one-color printing, which makes it difficult to display a three-dimensional effect through four-primary color printing or special effects (for example, two-way transformation, motion, and morph effects) in a lenticular technique.

Furthermore, due to the parallel, linear nature of the plurality of semi-cylindrical lenses in the lenticular screen, the orientation of the screen becomes a limiting factor in applying the screen to a base material rather than the orientation of the image.

SUMMARY OF THE INVENTION

In one aspect, methods are provided for making a product having a three-dimensional surface. The method can include providing a base material, providing an adhesive layer and positioning the adhesive layer relative to the base material. The method can further include providing a three-dimensional sheet having a top surface and a bottom surface, the top surface having a convex lens layer. The three-dimensional sheet can be positioned relative to the base material based on a registration of an image on the three-dimensional sheet. The bottom surface of the three-dimensional sheet can be secured to the base material using the adhesive layer. Securing the three-dimensional sheet to the base material can include applying pressure to the three-dimensional sheet. In one aspect, securing the three-dimensional sheet to the base material can include applying pressure in successive steps of increasing pressure.

In another aspect, a product is provided that comprises a base material and a three-dimensional sheet comprising a transparent plate having a top surface and a bottom surface, a focal distance layer printed on the bottom surface of the transparent plate and a non-focal distance layer printed on the top surface of the transparent plate, and a convex lens layer having an array of identical semi-spherical convex lenses each having a focal distance, wherein the convex lens layer is adhered to the top surface of the transparent plate. The product can also comprise an adhesive layer disposed therebetween the base material and the bottom surface of the transparent plate, wherein the adhesive layer is configured to secure the bottom surface of the three-dimensional sheet to the base material.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Embodiments of the present invention may be understood more readily by reference to the following detailed description. It is to be understood that the terminology used herein is for the purpose of describing particular embodiments only and is not intended to be limiting.

As used herein, the singular forms "a," "an" and "the" include plural referents unless the context clearly dictates otherwise. Thus, for example, reference to a "convex lens" includes embodiments having two or more such convex lenses unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Figure 1:
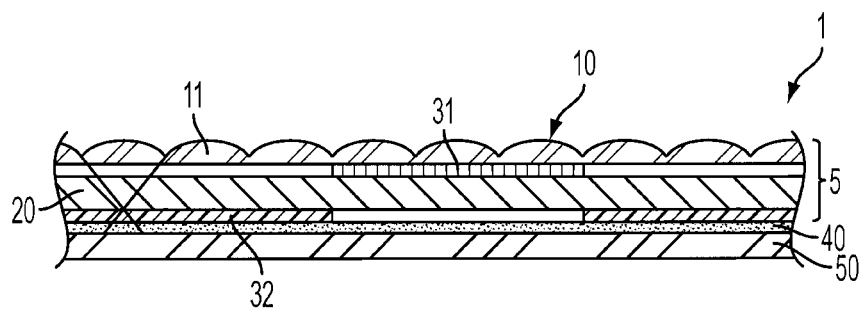
FIG. 1 is a perspective view showing a product having a three-dimensional surface according to a first embodiment of the present invention.
Figure 2:
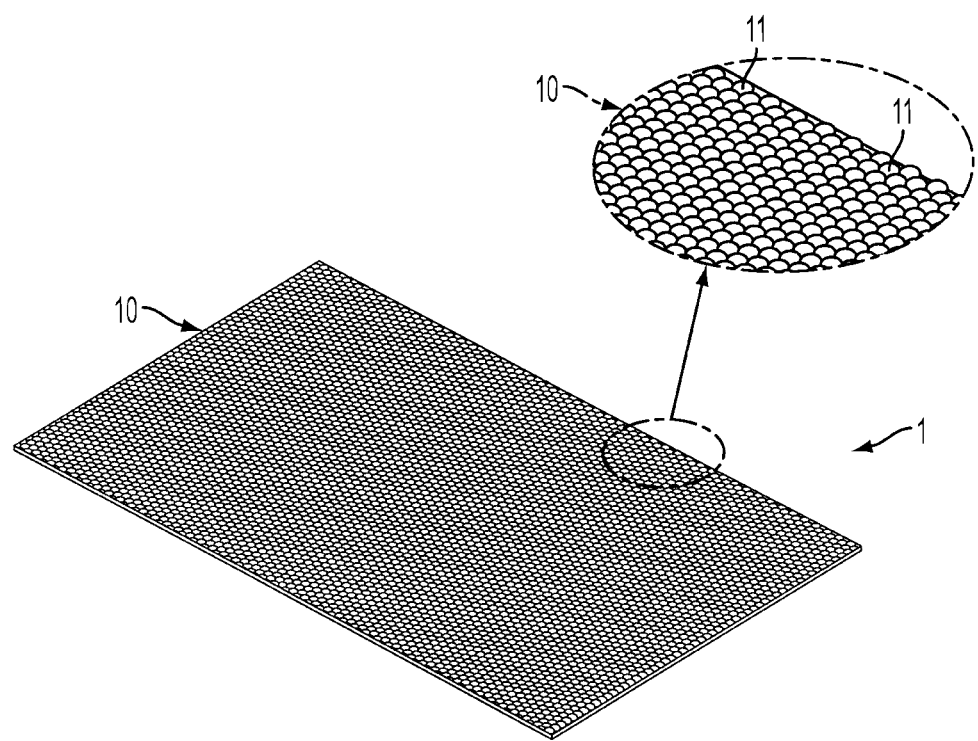
FIG. 2 is a perspective view showing a three-dimensional sheet according to a first embodiment of the present invention.
Figure 3:
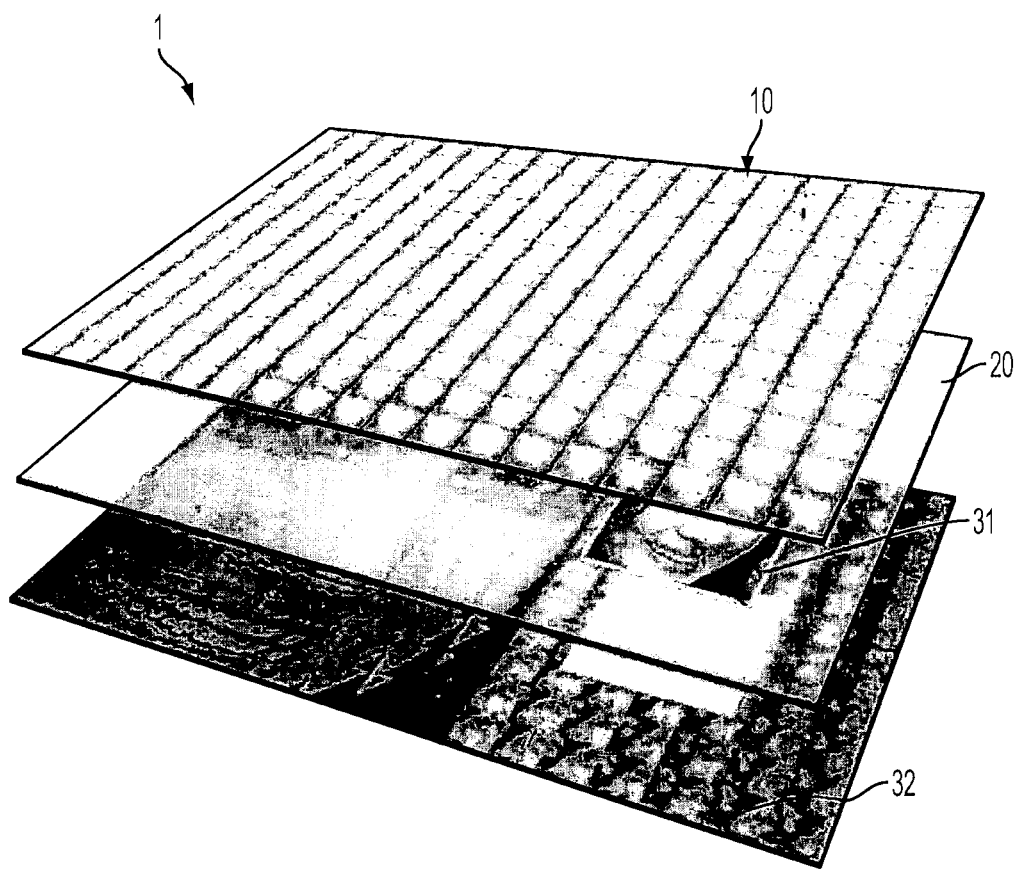
FIG. 3 is an exploded perspective view showing the three-dimensional sheet of FIG. 2.
Figure 4:
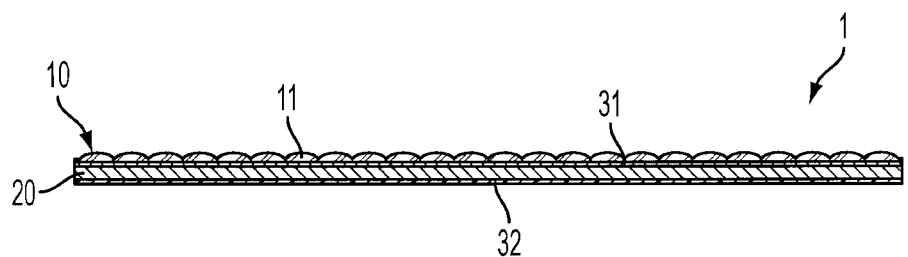
FIG. 4 is a sectional view showing the three-dimensional sheet of FIG. 2.
Figure 5:
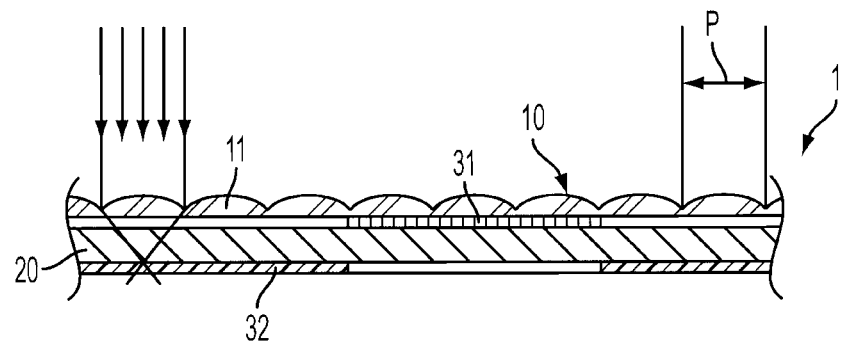
FIG. 5 is a partly enlarged sectional view showing the three-dimensional sheet of FIG. 2.

Referring to FIG. 1, an exemplary product 1 having a three-dimensional surface in accordance with an embodiment of the present invention is shown. Products 1 may include, but are not limited to, phone, gift, membership, loyalty, and like cards, cups or containers, or postcards, greeting cards or the like. The product 1 as described herein may be an end product or may be a component of a larger product, for example, an insert for a cup as described in U.S. Pat. No. 7,153,555, which is incorporated herein in its entirety.

According to one embodiment, the product 1 generally includes a three-dimensional sheet 5 secured to a base material 50 via an adhesive layer 40. The base material 50 can be, for example, paper, resin, plastic, glass, rubber, metal, alloy, or combinations thereof. Furthermore, the base material 5 can be, for example, polystyrene, polyvinyl chloride (PVC), PVC laminated polystyrene, compression laminated polystyrene, compression laminated PVC, polyester, polyolefins such as polyethylene, polypropylene, and the like, ABS, acrylics, epoxies, polyurethanes, polycarbonates, or combinations or laminates thereof. Additionally, the base material 5 can be, for example, opaque, transparent or semi-transparent. The base material 5 can be configured in the processing machinery as a continuous web or otherwise and has a desired thickness, whether constant or variable, for a given product 1.

The adhesive layer 40 may take various forms, including but not limited to, a pressure sensitive adhesive (PSA), a moisture cure adhesive, radiation curable adhesive, UV curable adhesive, a photo-cure adhesive, a thermo-setting resin, glue, or like materials. The adhesive can be applied to either or both the three-dimensional sheet 5 or the base material 50 with any suitable means, for example, a roll coater, spray coater, a curtain coater, a screen press through a screen and like devices.

The three-dimensional sheet 5 has a convex lens layer 10 disposed on the uppermost surface of the three-dimensional sheet 5. The three-dimensional sheet 5 is preferably manufactured in accordance with the methods disclosed in U.S. Pat. No. 7,130,126, which is incorporated herein in its entirety, but may be made in other manners and have different configurations than described herein.

Figure 10:
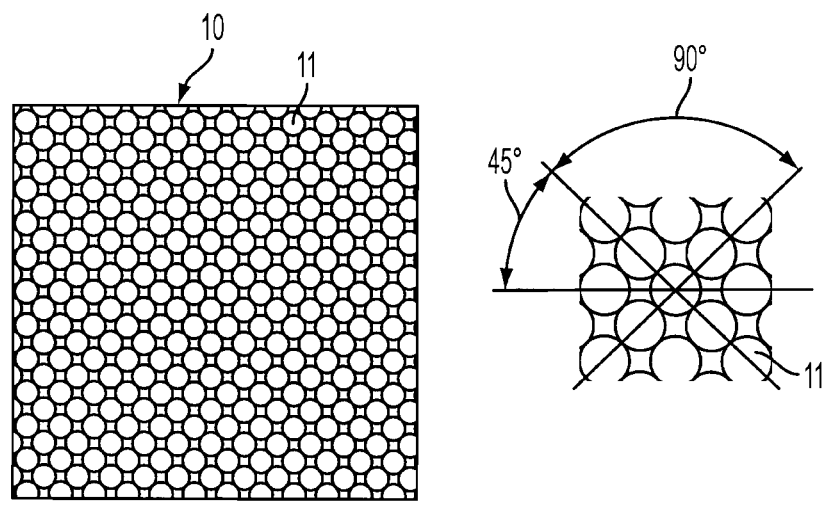
FIG. 10 is a plane view showing the convex lenses are arranged at an inclination of 45° on a convex lens layer adopted in the present invention.

Referring to FIGS. 2-5, in the illustrated embodiment, the convex lens layer 10 is formed of a transparent synthetic resin by means of molding in such a manner as to have an array of identical semi-spherical convex lenses 11 formed vertically and horizontally on the top surface thereof. The convex lenses 11 of the convex lens layer 10 are arranged, as shown in FIG. 10, at an inclination of 45°, in such a manner that the imaginary lines passing the centers of the convex lenses 11 have a crossing angle of 90°.

Figure 11:
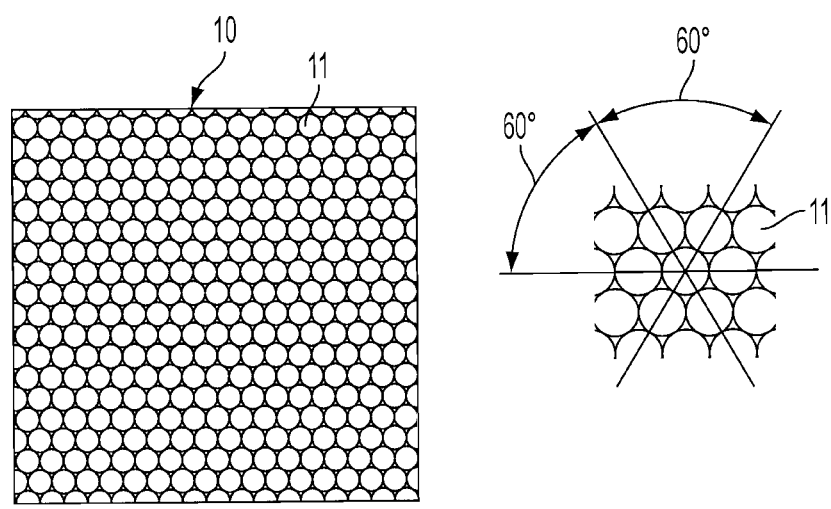
FIG. 11 is a plane view showing the convex lenses are arranged at an inclination of 60° on a convex lens layer adopted in the present invention.

In some cases, the convex lenses 11 may be arranged at different angles, for example, as shown in FIG. 11, at an inclination of 60°, in such a manner that the imaginary lines passing the centers of the convex lenses 11 have a crossing angle of 60°. In the preferred embodiments of the present invention, however, the convex lenses 11 preferably have an inclination of 45°.

A transparent plate 20, which is formed of a transparent synthetic resin, is disposed on the bottom surface of the convex lens layer 10, and in this case, the transparent plate 20 has the same thickness as a focal distance of each convex lens 11.

A non-focal distance printed layer 31 is disposed on the top surface of the transparent plate 20 by means of offset printing for providing a real picture screen thereon. The printing of the real picture screen image 35 is performed using a desired registration of the plate 20 such that the image 35 has a registration relative to the plate 20, and thereby, the three-dimensional sheet 5.

The non-focal distance printed layer 31 has a general printed surface that is a part placed on the special effect printed surface of a focal distance printed layer 32 for providing a three-dimensional screen thereon, as will be discussed. The general printed surface is displayed with the desired image 35, for example, subject pictures, product photographs, various patterns, and so on.

At this time, the special effect printed surface of the focal distance printed layer 32 is used for displaying the three-dimensional effect or the special effect of the pattern formed continuously from the top to the bottom thereof and from the left to the right thereof.

As a result, the differences of depth senses and the visual differences of special effects can be recognized between the special effect printed surface (having a non-three-dimensional effect, a three-dimensional effect, a motion effect, a transformation effect, and the like) of the focal distance printed layer 32 and the general printed surface of the non-focal distance printed layer 31.

The focal distance printed layer 32 is disposed on the bottom surface of the transparent plate 20 by means of the offset printing for providing the three-dimensional screen through four-color dot printing computed and image-segmented by a computer graphic process, such that the three-dimensional screen can be seen through the convex lens layer 10.

Figure 8:
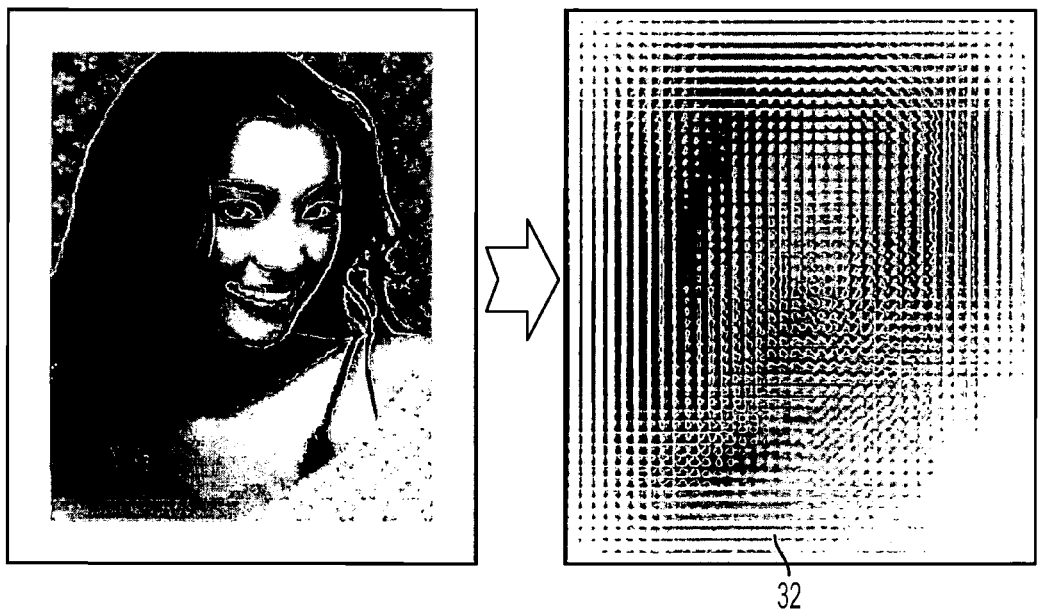
FIG. 8 is a view showing the image of the special effect printed surface on a focal distance printed layer is separated through a computer graphic process.
Figure 9:
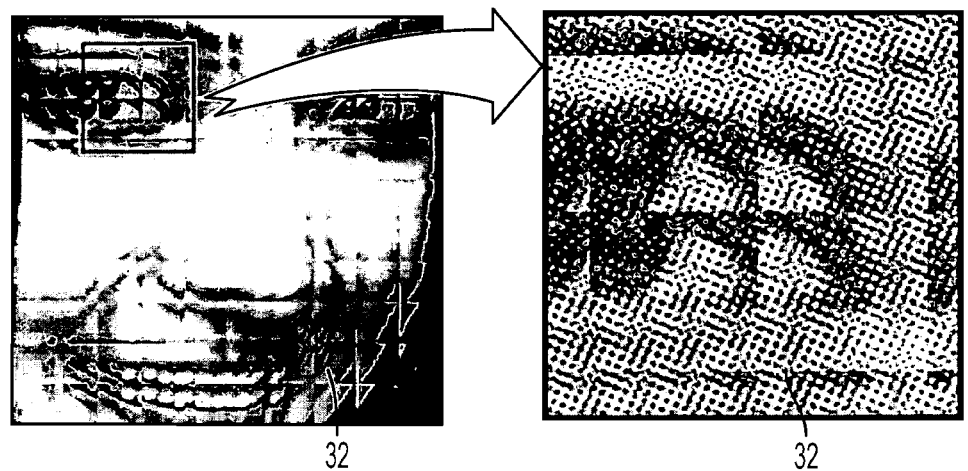
FIG. 9 is an enlarged view showing a part of FIG. 8, wherein the structure of dots by means of offset printing is enlarged.

The focal distance printed layer 32 is formed by means of the four-color dot printing having the same intervals and arrangements as the convex lenses 11, and as shown in FIGS. 8 and 9, it is made through the image segmentation in the computer graphic process. The manner of printing on the two layers 31 and 32 is preferably as described in U.S. Pat. No. 7,130,126, but other methods may also be utilized.

Figure 12:
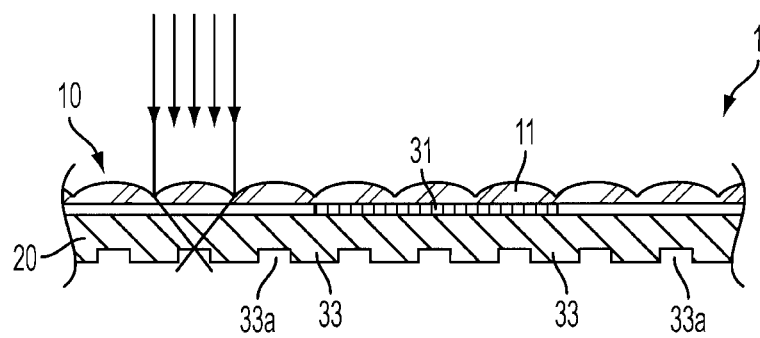
FIG. 12 is a sectional view showing a three-dimensional sheet according to a third embodiment of the present invention.
Figure 13:
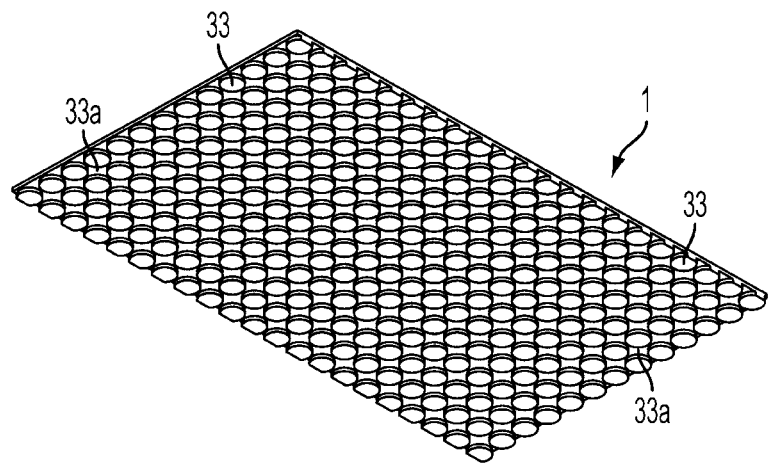
FIG. 13 is a perspective view showing the underside of the three-dimensional sheet of FIG. 12.

On the other hand, as shown in FIGS. 12 and 13, instead of the focal distance printed layer 32, an array of embossing patterns 33 is formed on the bottom surface of the transparent plate 20. A plurality of grooves 33a, which are formed between the respective embossing patterns 33, may be disposed at the focal positions of the respective convex lenses 11.

The convex lens layer 10 is bonded to the transparent layer 20 with the printed layers 31 and 32 disposed thereon by means of laminating or adhesive.

Since the special effect printed surface of the focal distance printed layer 32 and the general printed surface of the non-focal distance printed layer 31 are disposed at the top and bottom surfaces of the transparent plate 20, the effects that can be seen through the convex lens layer 10 are differently displayed. That is to say, the product pictures or subject pictures printed on the general printed surface look like floating in the space or going away into the space on the background having lots of figures printed on the special printed surface, thereby providing a high quality of three-dimension effect to the three-dimensional sheet 5.

Figure 6:
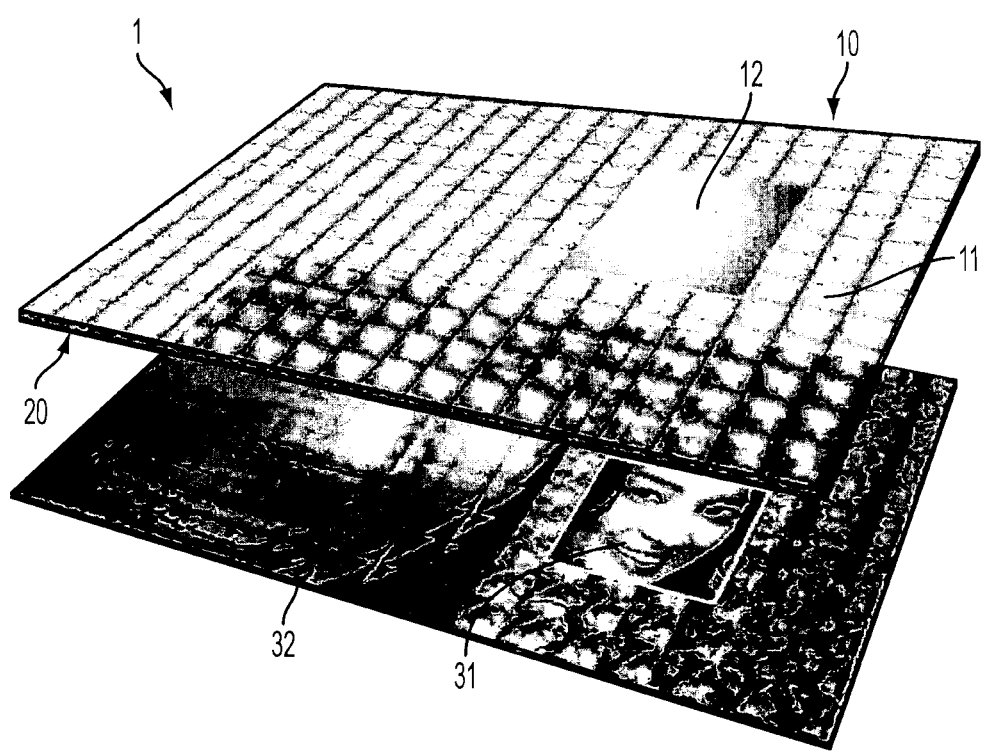
FIG. 6 is an exploded perspective view showing a three-dimensional sheet according to a second embodiment of the present invention.
Figure 7:
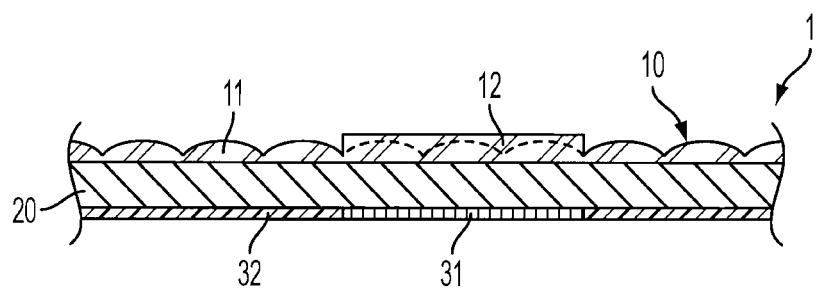
FIG. 7 is a partly enlarged sectional view showing the three-dimensional imaging sheet according to FIG. 6.

As described in U.S. Pat. No. 7,130,126 and shown in FIGS. 6 and 7, a generally flat viewing window 12 may be partially formed on the convex lens layer 10, and the non-focal distance printed layer 31 is partially formed on the focal distance printed layer 32 in such a manner as to be disposed just below the viewing window 12.

Figure 14:
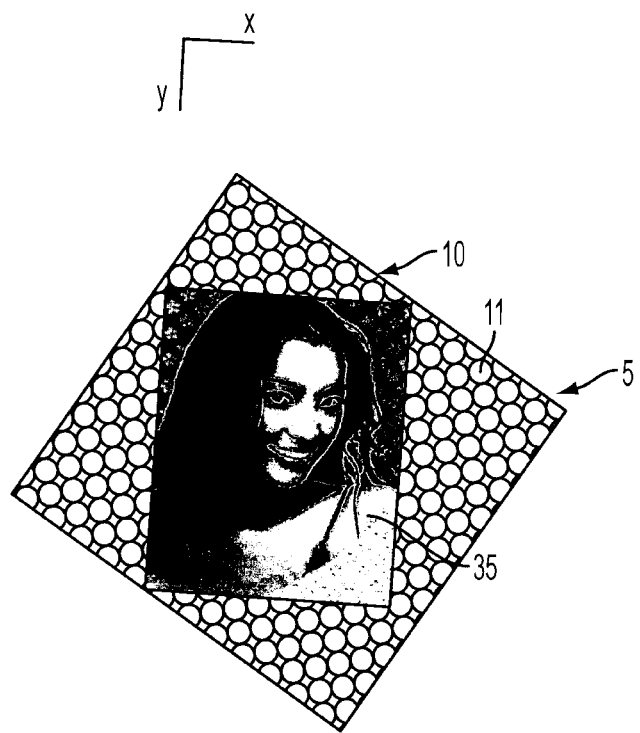
FIG. 14 is an exploded perspective view illustrating the three-dimensional sheet registered with respect to the base material.
Figure 14:
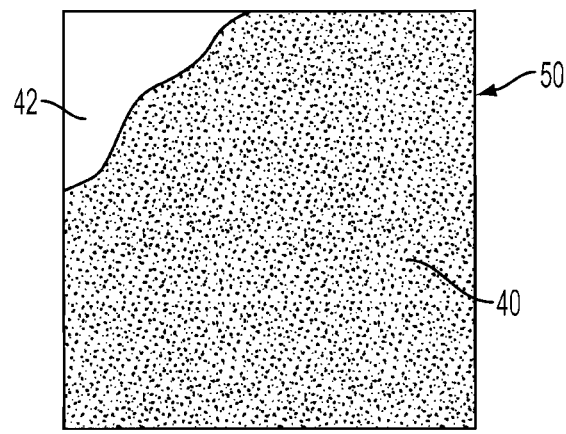
Figure 15:
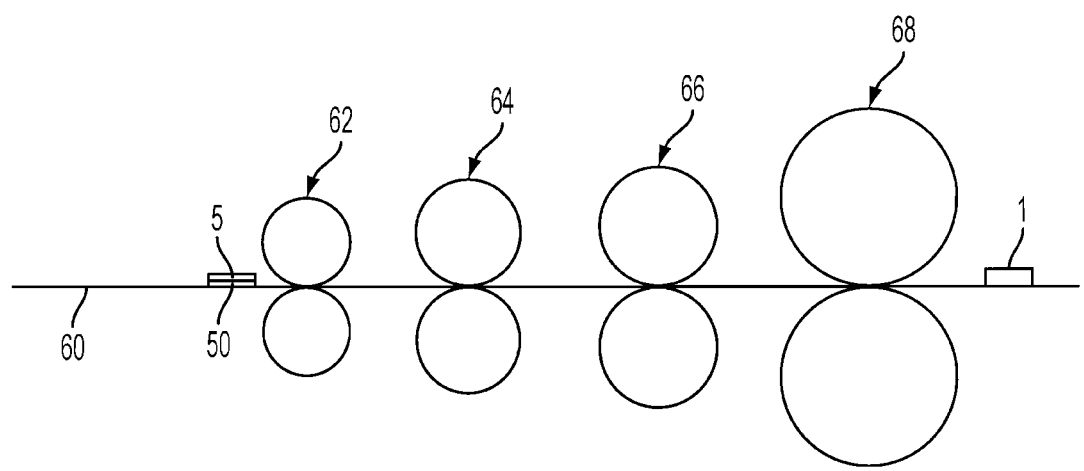
FIG. 15 is a schematic view illustrating an exemplary rolling laminating process in accordance with an embodiment of the invention.

Referring to FIGS. 14 and 15, an exemplary method of laminating the three-dimensional sheet 5 with the base material 50 in accordance with an embodiment of the invention will be described. In the present embodiment, an extruded pressure sensitive adhesive (PSA) layer 40, for example a blend of 80% acrylic and 20% rubber-based material, with a silicone release liner 42 is applied to the base material 50. The adhesive layer 40 may be applied to the base material 50 through a pressure nip roller (not shown). Other application methods may be utilized as described above. Additionally, the adhesive layer 40 may alternatively be applied to the three-dimensional layer 5.

To laminate the layers together, the release liner 42 is removed exposing the adhesive layer 40. The three-dimensional sheet 5 is then registered relative to the base material 50. Since the lenses 11 of the convex lens layer 10 have a uniform arrangement as illustrated in FIGS. 10 and 11, registration may be completed by using the registration of the image 35, as indicated by the x-y coordinates, rather than the orientation of the three-dimensional sheet 5. This increases the likelihood that the image 35 is properly positioned in the finished product 1.

Once registered, the three-dimensional sheet 5 and the base material 50 are tip mounted along the lead edge of the two materials and fed along a conveyor 60. The tip mounted materials are fed into a series of rollers 62-68 as illustrated in FIG. 15. The rollers 62-68 gradually apply increasing amounts of pressure to ensure complete adhesion. That is, roller pair 62 applies lightest pressure, roller pair 64 slightly increases the pressure, followed by subsequent increases in roller pairs 66 and 68. By gradually increasing the amount of applied pressure, the pressure on the convex lens layer 10 is minimized. The finished product 1 exits the last roller pair 68 with the layers laminated together. While nip rollers are illustrated herein, other types of laminating machines, for example, a flexo machine, may also be utilized.

Lastly, it should be understood that while the present invention has been described in detail with respect to certain illustrative and specific embodiments thereof, it should not be considered limited to such, as numerous modifications are possible and contemplated, without departing from the broad spirit and scope of the present invention as defined in the appended claims.

What is claimed:

1. A method of making a product having a three-dimensional surface, comprising:
   providing a base material;
   providing an adhesive layer and positioning the adhesive layer relative to the base material;
   providing a three-dimensional sheet having a top surface and a bottom surface, the top surface having a convex lens layer having an array of identical semi-spherical convex lenses each having a focal distance and a special effect layer disposed on the sheet at a selected distance from the convex lenses equal to the focal length of the lenses;
   positioning the three-dimensional sheet relative to the base material based on a registration of an image on the three-dimensional sheet; and
   securing the bottom surface of the three-dimensional sheet to the base material using the adhesive layer.

2. The method of claim 1, wherein securing the bottom surface of the three-dimensional sheet to the base material comprises applying pressure to the three-dimensional sheet.

3. The method of claim 2, wherein applying pressure to the three-dimensional sheet comprises applying pressure in successive steps of increasing pressure.

4. The method of claim 1, wherein providing the adhesive layer comprises providing an adhesive layer having a release liner, the method further comprising removing the release liner prior to securing the bottom surface of the three-dimensional sheet to the base material using the adhesive layer.

5. The method of claim 1, wherein the base material comprises one or more of paper, resin, plastic, glass, rubber, metal, or alloy.

6. The method of claim 1, wherein the base material comprises one or more of polystyrene, polyvinyl chloride, PVC laminated polystyrene, compression laminated polystyrene, compression laminated PVC, polyester, polyolefins such as polyethylene, polypropylene, and the like, ABS, acrylics, epoxies, polyurethanes, or polycarbonates.

7. A product having a three-dimensional surface, comprising:
   a base material;
   a three-dimensional sheet comprising a transparent plate having a top surface and a bottom surface, a focal distance layer printed on the bottom surface of the transparent plate and a non-focal distance layer printed on the top surface of the transparent plate, and a convex lens layer having an array of identical semi-spherical convex lenses each having a focal distance, wherein the convex lens layer is adhered to the top surface of the transparent plate; and
   an adhesive layer disposed therebetween the base material and the bottom surface of the transparent plate, wherein the adhesive layer is configured to secure the bottom surface of the three-dimensional sheet to the base material.

8. The product of claim 7, wherein the base material comprises one or more of paper, resin, plastic, glass, rubber, metal, or alloy.

9. The product of claim 7, wherein the base material comprises one or more of polystyrene, polyvinyl chloride, PVC laminated polystyrene, compression laminated polystyrene, compression laminated PVC, polyester, polyolefins such as polyethylene, polypropylene, and the like, ABS, acrylics, epoxies, polyurethanes, or polycarbonates.

* * * * *